United States Patent [19]

Hess

[11] 4,456,921
[45] Jun. 26, 1984

[54] COMB FILTERING FOR NTSC TELEVISION SIGNALS

[75] Inventor: Heinz Hess, Weiterstadt, Fed. Rep. of Germany

[73] Assignee: Robert Bosch GmbH, Stuttgart, Fed. Rep. of Germany

[21] Appl. No.: 326,505

[22] Filed: Dec. 2, 1981

[51] Int. Cl.³ .......................................... H04N 9/535
[52] U.S. Cl. ...................................................... 358/31
[58] Field of Search ......................................... 358/31

[56] References Cited

U.S. PATENT DOCUMENTS

| 4,003,079 | 1/1977 | Woo | 358/31 |
| 4,072,984 | 2/1978 | Kaiser | 358/31 |
| 4,143,396 | 6/1979 | MacKenzie | 358/31 |
| 4,345,268 | 8/1982 | Clarke | 358/31 |

OTHER PUBLICATIONS

A CCD Comb Filter for Color TV Receiver Picture Enhancement, Pritchard, RCA Review, vol. 41, Mar. 1980, pp. 3-17.
A Practical Charge-Coupled Device Filter for the Separation of Luminance and Chrominance Signals in a Television Receiver, IEEE Trans. on Cons. Elec., vol. CE-23, No. 3, Aug. 1977, pp. 342-356.

Primary Examiner—Michael A. Masinick
Attorney, Agent, or Firm—Frishauf, Holtz, Goodman & Woodward

[57] ABSTRACT

Method and apparatus for comb filtering NTSC type television signals is described. The television signal is delayed by one line period, the delayed and the undelayed television signal are averaged. The resulting signal is delayed again by one line period and the delayed and the undelayed resulting signals are averaged, too. The result of the second averaging on the one hand is the luminance signal and on the other hand is subtracted by the television signal delayed by one line period. The result of such subtraction is the chrominance signal.

7 Claims, 5 Drawing Figures

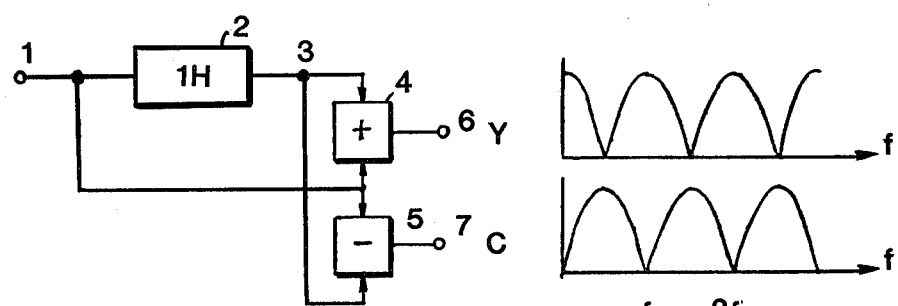
FIG. 1a State of the Art
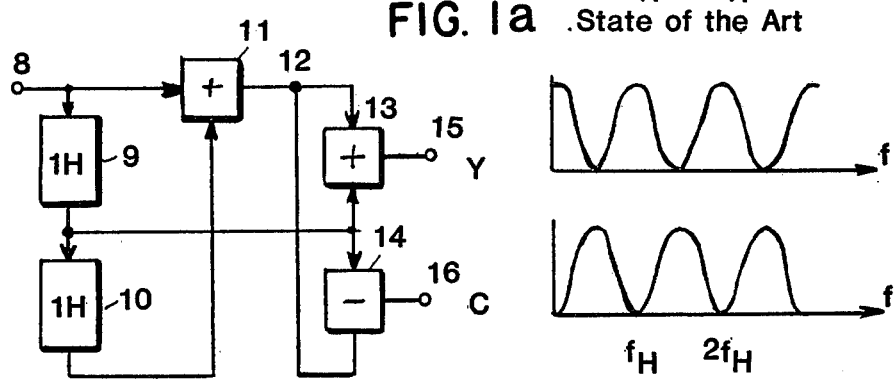
FIG. 1b State of the Art
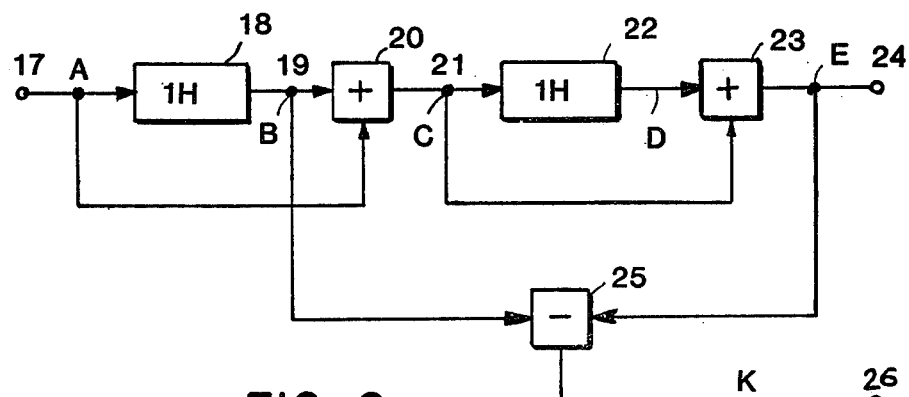
FIG. 2

4,456,921

COMB FILTERING FOR NTSC TELEVISION SIGNALS

BACKGROUND OF THE INVENTION

The invention described herein is directed generally to comb filters and particularly to a filter and method for separating the luminance and chrominance components of a television signal encoded according to NTSC standards.

A Fourier analysis of the signal in the video domain indicates an energy spectrum concentrated in discrete clusters with interval spacings of line frequency (i.e. 15.734 kHz) with subside bands grouped around each 15.734 kHz interval at multiples of 60 Hz and 30 Hz spacing. According to the NTSC standard the color subcarrier and its modulation side bands are interleaved with the base band spectrum by synchronizing the subcarrier with horizontal sync as an odd multiple of one half line rate.

This interleaving enables the separation of the luminance and the chrominance signal by comb filters. Examples of such filters are described in RCA Review, March 1980, Vol. 41, No. 1, pages 3 to 28.

OBJECTS OF THE INVENTION

It is a general object of the invention to provide an improved comb filter for use with chrominance/luminance separation of NTSC television signals.

It is more specific object of the invention to provide a comb filter for such purpose. The elements thereof may have larger tolerances in view of differential phase, linearity, delay, and signal level, so that cheaper elements may be used and/or less time will be spent for adjustment procedures during the manufacturing process of such comb filter.

BRIEF DESCRIPTION OF THE FIGURES

The objects stated above and other objects of the invention are more particularly set forth in the following detailed description and the accompanying drawings, of which:

FIGS. 1a and 1b show block diagrams of two known comb filters;

FIG. 2 shows as a block diagram a preferred embodyment of a comb filter according to the invention;

SUMMARY OF THE INVENTION

Figure 3:
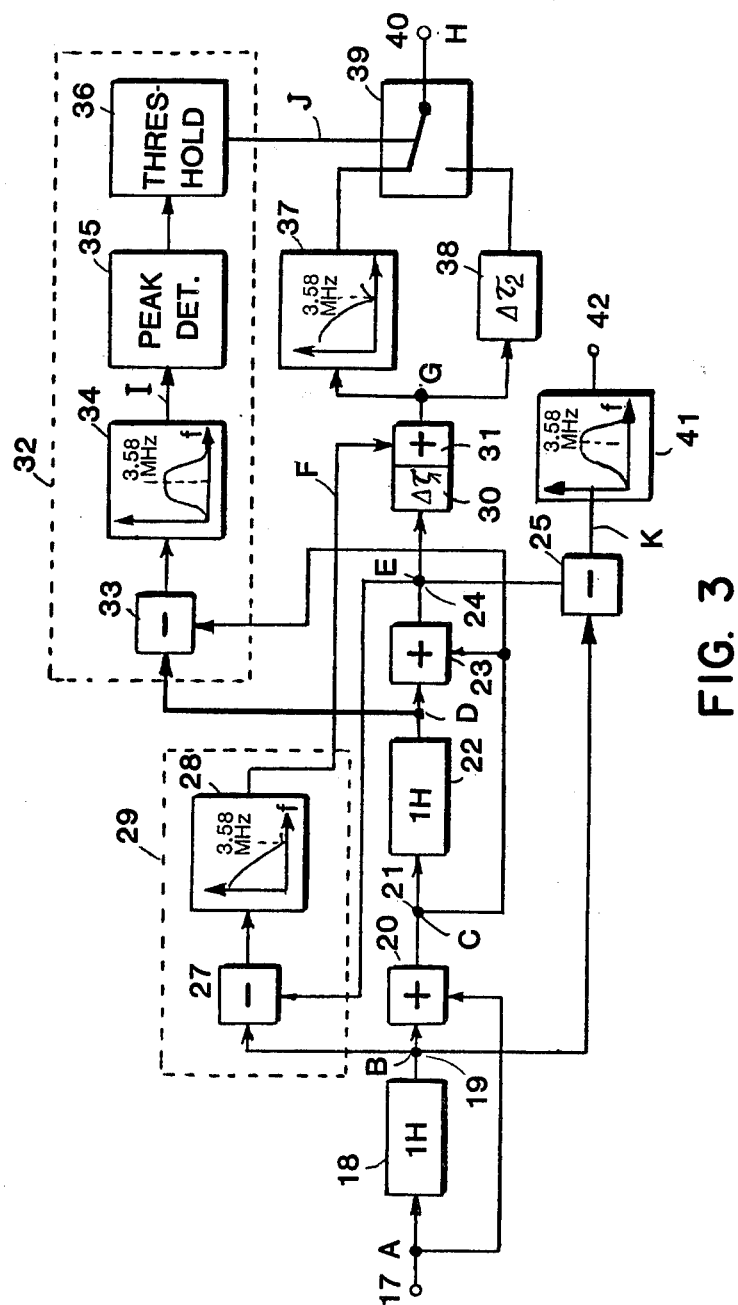
FIG. 3 a more detailed block diagram of a comb filter according to FIG. 2.

According to the method and apparatus of the invention, the television signal is delayed by one line period and an intermediate signal is generated by averaging the undelayed and the delayed television signal. The intermediate signal is delayed by one line period and the undelayed and the delayed intermediate signal are averaged in order to generate a luminance signal. Further, the luminance signal and the television signal which is delayed by one line period, are subtracted. The result of this subtraction is the chrominance signal.

According to another aspect of the invention a vertical aperture correction signal is formed by low pass filtering of the chrominance signal applying a low pass filter response with a null at sub-carrier frequency.

According to a further aspect of the invention the luminance signal is low pass filtered whenever the peak value of a auxiliary signal which is formed by filtering the difference between the undelayed and delayed intermediate signal exceeds a given value.

DESCRIPTION OF THE PREFERRED EMBODIMENT

Referring now to FIG. 1 there are shown two comb filter arrangements according to the state of the art. The arrangement according to FIG. 1a comprises one delay line 2, delaying the television signals supplied to the input 1 of the arrangement by one line period (1H). The undelayed and the delayed television signals are added and subtracted. Therefore, the input 1 and the output 3 of the delay line 2 are connected with the input terminals of an adding circuit 4 and a subtraction circuit 5. In order to avoid an unwanted increase of the signal amplitudes the signals are attenuated before or after being added or subtracted. This is not shown in the figures since the normal dealing with signal levels is a matter of practice. The output 6 of the adding circuit 4 provides the luminance signal Y, the output 7 of the subtracting circuit 5, the chrominance signal C. The frequency reponses of both outputs are shown in the diagrams besides the block diagram. As it is well known in the art, comb filters or socalled recursive filters have a periodic frequency response. That one for the luminance signal Y has peaks at 0, $f_H$, $2f_H$, etc., and nulls at $\frac{1}{2}f_H$, $3/2f_H$ etc. The response for the chrominance signal C has nulls at 0, $f_H$ $2f_H$ and so on and peaks at $\frac{1}{2}f_H$, $3/2f_H$, $5/2f_H$ and so on. The nulls of the responses of the arrangement according to FIG. 1a are very sharp. Therefore, the components which are to be suppressed are only fairly suppressed if the frequency deviates only slightly from the frequency of the nulls.

Another comb filter arrangement the responses of which have broader nulls is shown in FIG. 1b. This comb filter uses two one-line delay lines 9 and 10 through which the television signal applied at 8 passes. The television signal delayed by two line periods and the undelayed television signal are added in the adding circuit 11. The output 12 of the adding circuit 11 is connected with one terminal each of the adding circuit 13 and the subtracting circuit 14. The other terminals of these circuits are connected with the output of the first delay line 9. The outputs 15 and 16 of the adding circuit 13 and the subtracting circuit 14 provide the luminance signal Y and the chrominance signal C.

Referring now to FIG. 2, there is shown a comb filter for implementing the invention. The NTSC signal is applied to the input 17 of the circuit arrangement according to FIG. 2. This signal is delayed by the delay line 18 by one line period. The output 19 of the delay line 18 is connected to a first input terminal of the adding circuit 20, the second input terminal of which is connected to the input 17. The output signal of the adding circuit 20 is the sum of the undelayed and the delayed television signal. This signal is called hereinafter intermediate signal. To avoid an increase of amplitude, the adding circuit 20 comprises an attenuation by the factor 2.

Figure 4:
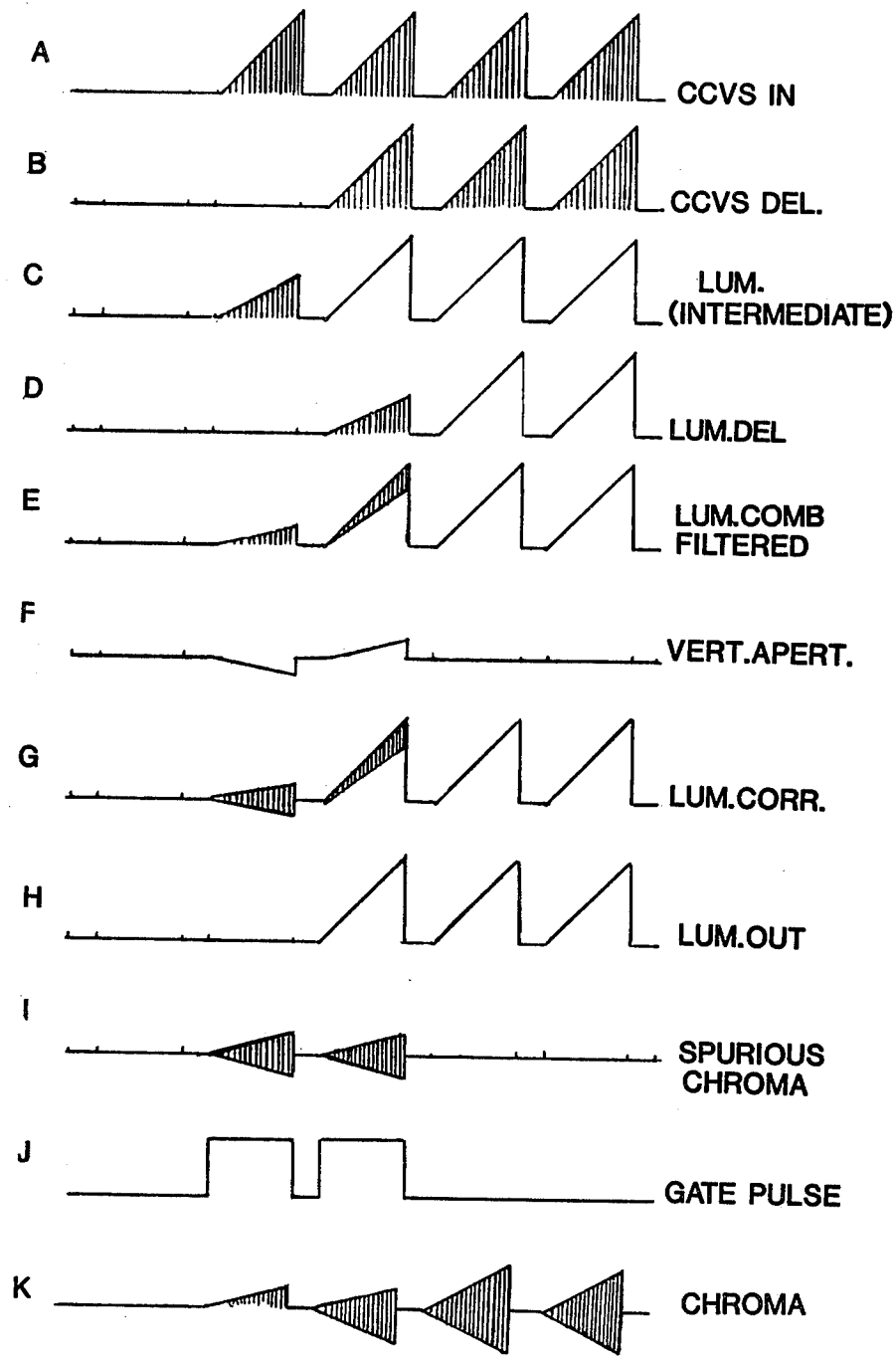
FIG. 4 time diagrams of signals occuring in the embodyment according to FIG. 3.

The signals occuring at different points of the circuit arrangement of FIG. 2 are shown among others in the diagrams of FIG. 4. The input signal is a so-called composite color video signal (CCVS) and is shown in line A of FIG. 4. The diagrams are based on a CCVS with one black line and four lines having a jigsaw function. The subcarrier is illustrated by hatching. It is well understood that this signal is of such kind as usually generated for tests and measuring purposes. Line B shows the CCVS delayed by one line period.

Line C illustrates the result of the averaging by the adding stage 20. During that line during which the delayed CCVS still comprises black, the input CCVS only is attenuated but comprises as well as luminance as chrominance components. During the following line, the subcarrier is suppressed but the luminance signal remains. The signal illustrated in line C of FIG. 4 is already a luminance signal but comprises some spurious chroma components, some of which occur at horizontal edges in the picture. Other ones occur at inclining edges as a consequence of the disadvantages of a one delay line comb filter explained above. In addition to this the first comb filter may not operate accurately due to practical imperfections like misadjustments, temperature influences, and aging of electronic components. Therefore, the signal shown in line C is delayed a second time by the delay line 22 and averaged with the undelayed signal of line C by adding means 23. The result is illustrated in diagram E.

At horizontal edges two lines are disturbed by remaining chroma components but this will be corrected lateron. The important effect of the second comb filtering is that the reproduction of inclining edges is very much improved and that the above mentioned additional spurious chroma components are suppressed by the second comb filter.

At the output 24 a luminance signal is available for further treatment. The delayed CCVS (B in FIG. 5) and the luminance signal at the output 24 are subtracted by the subtracting circuit 25. The result is the chrominance component at the output 26 illustrated in line K of FIG. 4.

FIG. 3 shows the same circuit arrangement as FIG. 2 extended by some improvements. The parts of FIG. 3 already described in connection with FIG. 2 have the same numbers as the respective parts of FIG. 2.

Because of the averaging of the delayed and undelayed signals, the vertical resolution is decreased. In order to compensate this effect a vertical aperture corrector is included in the circuit arrangement according to FIG. 3. This circuit receives the signals illustrated in lines B and E of FIG. 4 and subtracts these signals from each other in the subtracting circuit 27. The result is the chrominance signal illustrated in line K. This signal corresponds to the output chrominance signal gained by the use of the subtracting circuit 25 and available for further treatment on the terminal 26 (FIG. 2). Because this chrominance signal comprises some luminance components it is recommended to arrange a band pass 41 after the circuit 25 as shown in FIG. 3 having an output 42.

The output of the subtracting circuit 27 is connected to the input of a low-pass filter 28 in order to suppress the color subcarrier contained in such signal. The result is shown in line F of FIG. 4 and is used as vertical aperture correction signal. Therefore, it is added to the luminance signal by means of the adding circuit 31 after the luminance signal has been delayed by $\Delta \tau 1$. The delay device 30 is necessary to compensate the travel time of the respective signals in the vertical aperture corrector 29.

The output signals of the adding circuit 31 are shown in line G of FIG. 4.

The arrangement according to FIG. 3 includes a further circuit to suppress spurious chroma components. The circuit arrangement 32 for this purpose comprises a subtracting stage 33 forming the difference between the signals C and D which passes the band pass filter 34 the output signals of which are shown in line I of FIG. 4 representing the spurious chroma components. The peak amplitude of these components is measured by the peak detector 35 the output signal of which is led to a threshold circuit 36. The circuit 36 delivers an output pulse whenever the output signal of the peak detector 35 exceeds a given value. These pulses are shown in line J of FIG. 4 with the proposition that in the illustrated case the threshold is set-up very low.

During the occurance of the gate pulse, switch 39 is in the upper position so that the ouput of the low-pass filter 37 is connected to the output 40 of the complete circuit arrangement. During this time interval, the luminance signal occuring at point G of the circuit and illustrated in line G of FIG. 4 is filtered in order to suppress spurious chroma components. The filter 33 may be a conventional low-pass filter or a further comb filter. The application of the latter one would have the advantage that the resolution of the luminance signal would not suffer from the filtering process.

During the time when no spurious chroma components occur, switch 39 is switched to the lower position. Then the luminance signal passes the delay device 38 having a delay time of $\Delta \tau 2$ to compensate the delay time of the filter 37.

The particular circuits and devices of the preferred embodiment are well known in the art and do not need to be described in detail. An often used delay device for video signals is an ultra sonic delay line available in a great variety on the market. The compensating delay devices 30 and 38 and the low-pass and band-pass filters are preferably realized by inductor capacitor networks. For peak detecting, threshold switching, adding and subtracting many semiconductor circuits are well known.

Although the invention has been described in terms of specific preferred structure and steps, it will be obvious to those skilled in the art that many alterations and modifications thereto may be made being included within the spirit and the scope of the invention as defined by the appended claims.

What is claimed is:

1. A method for comb filtering an NTSC-type television signal comprising:
   (a) delaying the television signal by one line period and generating an intermediate signal by averaging the delayed and the undelayed television signal;
   (b) delaying the intermediate signal by one line period and generating a luminance signal by averaging the undelayed and the delayed intermediate signal; and
   (c) generating a chrominance signal by forming the difference between the television signal delayed by one line period and the luminance signal.

2. A method as set forth in claim 1 comprising:
   forming a vertical aperture correction signal by low-pass filtering the chrominance signal the response of the filter having a null at subcarrier frequency.

3. A method as set forth in claim 1 comprising:
   (a) forming the difference between the undelayed and the delayed intermediate signal;
   (b) band-pass filtering the difference signal whereby the band pass response has a peak at subcarrier frequency;
   (c) detecting the peak value of the filtered difference signal; and (d) low-pass filtering the luminance signal whenever the peak-value of the filtered difference signal exceeds a given value.

4. Comb filter for NTSC-type television signals comprising:

first and second delay means (18,22), each having a delay time of one television line, first and second adding means (20,23) each having two inputs and one output, the average value of the signals applied to the inputs appearing at the output;

the input and the output of each delay means (18,22) being connected to the inputs of the respective adding means (20,23);

the output (B) of the first delay means (18) and the output (E) of the second adding means (23) being connected to the inputs of a subtracting means (25).

5. Comb filter as set forth in claim 4 comprising: third adding means (31) the inputs of which are connected (a) to the output of the second adding means (23) and (b) to the output of a low-pass filter (28) the input of which is connected to the output of the subtracting means (25,27).

6. Comb filter as set forth in claim 4 comprising:

second subtracting means (33) subtracting the input signals of the second adding means (23);

band pass filter means (34) the peak frequency thereof is about the subcarrier frequency;

peak detection and threshold means (35,36) all together being connected in series;

switching means (39) inserting alternatively a low-pass filter (37) or a delay device (38) into the channel of the luminance signal;

a control signal input of the switching means (39) being connected to the output of the threshold means (36).

7. Comb filter as set forth in claim 4 including output means (K; 26) coupled to the subtracting means (25) for delivering a filtered chrominance signal.

* * * * *